Sept. 14, 1965          G. T. RANDOL          3,206,161
COMPENSATING VALVE MEANS FOR MASTER BRAKE CYLINDERS
Original Filed June 16, 1961
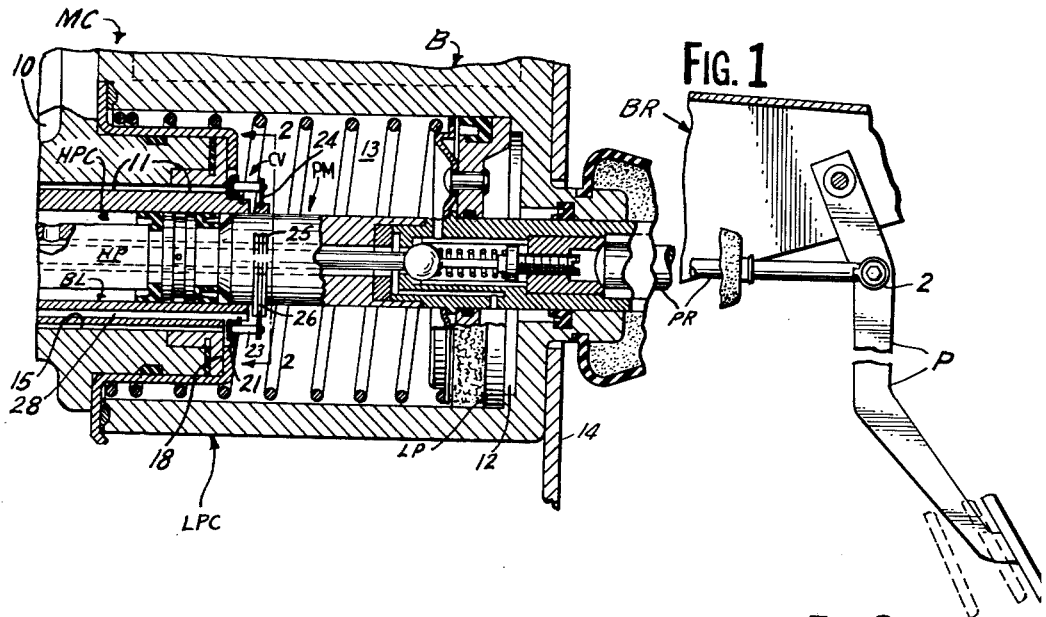
FIG. 1
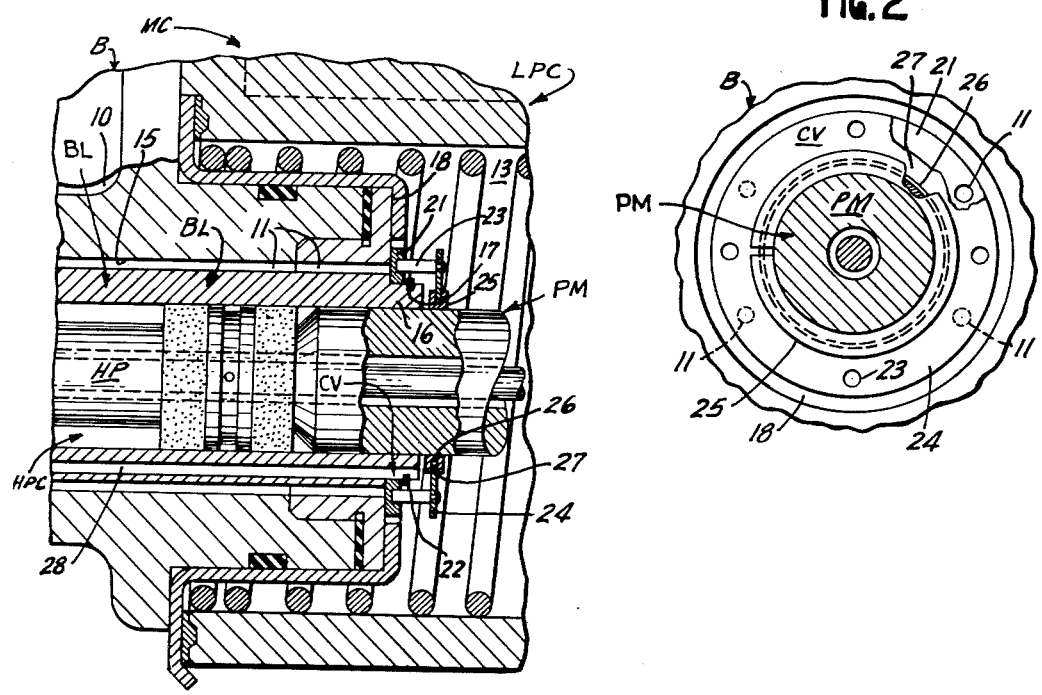
FIG. 2
FIG. 3
*Inventor*

United States Patent Office 3,206,161
Patented Sept. 14, 1965

3,206,161
COMPENSATING VALVE MEANS FOR MASTER BRAKE CYLINDERS
Glenn T. Randol, 3 E. 2nd Ave., Loch Lynn, Mountain Lake Park, Md.
Original application June 16, 1961, Ser. No. 126,404, now Patent No. 3,166,907, dated Jan. 26, 1965. Divided and this application Aug. 25, 1964, Ser. No. 391,924
6 Claims. (Cl. 251—81)

This application is a division of my copending application Serial No. 126,404, filed June 16, 1961, now Patent 3,166,907, dated January 26, 1965.

In my copending application above referred to, I have disclosed a compound (multi-stage) master brake cylinder having a fluid supply reservoir, a low-pressure piston reciprocable in a complementary cylinder, and a high-pressure piston reciprocable in a complementary cylinder of relatively smaller diameter than the low-pressure cylinder, and which is adapted to actuate the hydraulic brake system of automotive vehicles and the like. The low-pressure piston being effective to move fluid from the low-pressure cylinder at low velocity in large volume to quickly initiate a braking application to the extent of taking up the slack in the brake system in readiness for the high-pressure piston to move fluid from its complementary cylinder at high velocity in small volume to apply actual stopping effort to the vehicle wheels as required under the operating conditions of the vehicle. Control of fluid flow between said reservoir and the low-pressure cylinder being effected by novel compensating valve means responsive to cooperable thrust force and fluid pressure induced by said low-pressure piston upon effecting slack take-up, to close a plurality of passageways between said reservoir and low-pressure cylinder for conditioning the latter to move fluid into the brake system in large volume at low velocity to establish the vehicle brakes in said initial braking condition.

There are certain features of construction and operation which relate particularly to the compensating valve means per se, thus rendering such means applicable for controlling in part master cylinders of the type under consideration in operative association with systems and/or devices other than those which characterize vehicular brake systems. These features of the compensating valve means per se form the subject-matter of the present application.

The present invention has for a primary objective, the provision of new and improved compensating valve means operable in response to initial movement of an operator-operated member to close a passageway between a source of fluid and a pressure-working chamber comprising a hydraulic pressure-producing actuator, and thereby conditioning said working chamber to displace fluid under pressure from said chamber through a discharge outlet at low pressure and in large volume to actuate a connected hydraulic device, and wherein, upon such initial movement of the operator member, the pressure effective in said working chamber being cooperable with subsequent relative movement of said operator member in the same direction in which such initial movement was effected, to stabilize the closed condition of said passageway to insure isolation of the fluid source during low-pressure activation of the fluid.

A more specific object of the invention is to provide a new and improved frictionally-actuated low-pressure compensating valve for a compound master brake cylinder which is adapted to positively condition the low-pressure cylinder to pressurize the fluid therein in response to initial movement of the piston working in said cylinder, such initial movement also activating the high-pressure piston simultaneously with the low-pressure piston, to close the compensating port for the high-pressure cylinder and thereby conditioning the latter cylinder to pressurize the fluid therein supplementally to the pressurizing function of the low-pressure cylinder until a predetermined back pressure in the brake system reacts on a staging valve effective to change the low-pressure operation to high-pressure operation by overriding the closed status of the low-pressure compensating valve.

Another object is the provision of a novel compensating valve having a reciprocable actuatable member frictionally-connected to a movable valve element adapted to open and close an associated passage, and wherein initial movement of said member effects a like-movement of said valve element, said frictional connection accommodating relative movement of said member with respect to said valve element upon opening or closing said passage, in the same direction in which said passage was either opened or closed toward the corresponding extreme defining the full operating stroke of said member with respect to the other extreme.

Another object is the provision of the novel compensating valve defined in the object next preceding in which said frictional connection enables minute reciprocable movements of the valve element to open or close said passage under influence of like-reciprocable movements of said actuatable member at closely spaced stations along the full operating stroke of the latter member as defined by its two extremes.

With these and other objects and advantages in view, the invention consists of the new and novel constructions, and arrangements of the parts as hereinafter more fully described, set forth in the claims appended hereto, and disclosed in the accompanying drawing forming a part thereof, wherein:

FIGURE 1 is a fragmentary longitudinal vertical section of a master cylinder body in which my novel low-pressure compensating valve is incorporated, and which is shown in open position wherein the fluid reservoir and low-pressure working chamber are connected to render the latter inoperative.

FIGURE 2 is a transverse section taken along the line 2—2 of FIGURE 1 on an enlarged scale showing structural details of the low-pressure compensating valve means for controlling flow of fluid through a plurality of passages between the fluid reservoir and low-pressure working chamber; and FIGURE 3 is a fragmentary portion of FIGURE 1 on an enlarged scale showing the closed status of the low-pressure compensating valve wherein the low-pressure working chamber is operative to pressurize the fluid therein in response to initial movement of the operator member (brake-pedal).

On the accompanying drawing, I have used the reference character MC to indicate as a whole a master brake cylinder operatively incorporating the components comprising the present invention. This novel master cylinder may be described briefly as comprising a chambered body B formed internally with a fluid reservoir 10, a low-pressure unit or cylinder LUC and a high-pressure unit or cylinder HPC. The low-pressure cylinder is provided with compensating passages 11 and the high-pressure cylinder with a compensating port (not shown). The low-pressure cylinder is characterized by a low-pressure piston LP reciprocable in said latter cylinder, and which divides the same into a constant pressure chamber 12 and a variable pressure-working chamber 13 and including a normally preloaded spring for biasing said piston toward fully retracted position wherein said working chamber is inoperative. The low-pressure piston LP is effective when passages 11 are closed to displace fluid under pressure in large volume at low velocity through a discharge outlet (not shown) via a spring-biased high-pressure checkvalve (not shown).

The passages 11 may communicate with the reservoir fluid by means of an annular fluid space as shown which in turn communicates with the conventional intake port (not shown) or such passages may communicate directly with said port as is understood.

Operatively associated with said low-pressure piston is an operator-operated member illustrated by way of example as a pedal assembly including the conventional suspended-type pedal P pivotally mounted on a bracket identified by a fragmentary portion at BR which conventionally is attached at its forward end to the driver side of the vehicle firewall 14, as is well known. The pedal P is connected to the low-pressure piston by means of a push-rod PR.

Extending forwardly from the central portion of the low-pressure piston LP is a piston-carrying member PM projecting in part into the high-pressure cylinder to produce what may be termed the high-pressure displacement member or piston HP which cooperates with the low-pressure piston to effect initial braking force prior to the low-pressure cylinder becoming inoperative.

low-pressure compensating valve means generally designated CV are operatively associated with the rear (right) ends of said passages 11 which open into the low-pressure working chamber 13, to control fluid flow therethrough. Therefore, the passages 11 serve as fluid compensating means for the low-pressure working chamber 13 in a manner similar to the function of the compensating port (not shown) controlled by the high-pressure piston HP reciprocable in the high-pressure cylinder HPC.

The body B of the master cylinder is provided with a longitudinal bore 15 in which a liner BL is pressfitted substantially co-extensive therewith. A reduced diameter terminating flanged portion 16 of this liner projects into the low-pressure working chamber 13, said terminating portion being provided with an annular groove 17 spaced from wall 18 defining the flanged portion of said liner. Slidably disposed on this reduced flanged portion is a movable ring-like valve-forming element 21 adapted to overlie the aforesaid ends of said passages 11, and which is normally disposed in abutting relation with a split-type retaining ring 22 which engages said groove 17, said valve-forming element 21 when contiguous to said ring 22 is spaced from the ends of said passages therefore said flanged portion, to establish fluid communication between said low-pressure working chamber 13 and said fluid reservoir 10, thus establishing the pressure on the fluid in said latter chamber at atmospheric level.

Projecting rearwardly from the valve-forming element 21, is a plurality of circumferentially spaced pins 23 radially offset in parallel relation with respect to the axis of said piston-carrying member PM, and, as best shown in FIGURE 3, these pins are sufficiently spaced radially outwardly to clear the retaining ring 22 thus serving to join a ring-like member 24 and said valve-forming element 21 in axially spaced relationship as shown, for limited unitary movement on said reduced diameter portion 16 relative thereto as shown, to open (unblock) and to close (block) the cooperating ends of said passages 11.

Operatively incorporated between the inner peripheral portion of the ring-like member 24 and the outer diameter of the piston-carrying member PM, is a split contractible actuating element or ring 25, said actuating ring being slidably mounted on said piston-carrying member as shown in FIGURE 1 to have continuous frictional engagement therewith for actuation thereby to impart unitary reciprocable movement of limited extent to the valve forming element 21 and connected member 24, and thereby controlling the opening and closing of the passages 11 with a greater degree of positiveness than possible when fluid pressure alone is relied upon to perform this function as conventionally practiced in master cylinders of the type under consideration.

An external annular groove 26 is provided in the peripheral position of said actuating ring 25 for reception of an inner marginal portion 27 of the ring-like member 24, in annularly spaced relationship with respect to the bottom of said last-refined groove, to interconnect these two components for axial movement as a unit while accommodating limited relative radial movement therebetween, it being particularly noted that the depth of this groove 26 is slightly greater than the thickness of the engaging marginal portion on the ring-like member 24 for limited radial movement when installed, and, of course, the aforesaid annular space obtaining between said ring-like member 24 and the actuating ring 25, will increase as wear occurs in the latter as a result of slipping engagement on the piston-carrying member PM when the latter is actuated in the same direction beyond the position thereof effecting incremental unitary movement of the valve-forming element 21 to open or close the passages 11.

Thus, the compensating valve means CV when actuated to either of its positions of fluid control with respect to passages 11, it is seen that the frictional coefficient obtaining between the actuating ring 25 and the piston-carrying member PM enables the latter to continue in the same direction relative to the actuating ring after the latter and the valve-forming element 21 have been moved as a unit to open or close the passages 11.

The aforesaid opening and closing actuations of the compensating valve means CV are effectual at very closely spaced stations along the full operating stroke of the piston-carrying member PM as a function of incremental reciprocable movements relayed to the valve-forming element 21 by the actuating ring 25, in response to limited actuation of the latter element as a unit with said piston-carrying member, that is to say, a corresponding incremental movement of the low-pressure piston LP in a fluid pressurizing direction is effective to close the passages 11 by the compensating valve means CV to condition the low-pressure working chamber 13 to pressurize the fluid therein to take up the slack, for example, in a brake system for automotive vehicles or the like. Upon release of the low-pressure piston LP from any given position along its full operating stroke in a de-pressurizing direction, such initial incremental releasing movement is effective to actuate the valve-forming element 21 to unblock the ends of said passages 11, and thereby take the vehicle brakes "off." This incremental movement is simultaneously transmitted through the friction actuating ring 25 to effect withdrawal of the valve-forming element 21 from the flanged portion 18 to open (unblock) passages 11, and thereby relieving the pressure on the fluid in the low-pressure working chamber 13 to that of atmosphere, and thereafter, continued movement of the low-pressure piston LP and connected piston-carrying member PM under its spring bias toward normally released position as shown in FIGURE 1, maintains the compensating valve means CV withdrawn to enable two-directional fluid flow compensation between the reservoir 10 and working chamber 13. Such releasing movement of the low-pressure piston being accommodated by slipping engagement of the piston-carrying member PM relative to the actuating ring 25, the latter becoming stabilized at either of its closely spaced operating positions of fluid control depending on which direction the piston-carrying member PM and low-pressure piston LP are moving, that is, in a pressurizing or a pressure releasing direction of movement as is understood.

Similarly, the compensating valve means CV are maintained closed at closely spaced stations along the full operating stroke of the piston-carrying member PM in a pressurizing direction of movement, after initial movement thereof has correspondingly moved the valve-forming element 21 into contact with the flanged portion 18 to close the confronting ends of the passages 11 as shown in FIGURE 3 wherein the valve-forming element 21 is stabilized in spaced relation to the retaining ring 22.

In this latter operation, it is important to note that the pressure effective on the fluid in the low-pressure chamber 13 is also applied to a surface portion of the valve-forming element 21, and therefore such pressure application cooperates with the thrust force effective on the actuating ring 25 under piston-carrying member actuation, meaning that the thrust force exerted by the piston-carrying member through the frictional connection between the actuating ring 25 and said member on said valve-forming element after the latter has been moved thereby to close the passages 11, is effective to stabilize the valve-forming element 21 against said flanged portion 18 which defines the inner end portion of the bore liner BL as shown.

As best shown in FIGURE 3, the ends of the passages 11 confronting the valve-forming element 21 terminate flush with the rear face of the flanged portion 18, therefore when the valve-forming element 21 is seated thereagainst as shown in FIGURE 3, fluid flow through said passages is prevented (blocked) to condition the low-pressure working chamber 13 to displace fluid under pressure in large volume and at low velocity through passages 28 controlled by the high-pressure check-valve (not shown) for low pressure operation of the connected vehicle brakes (not shown).

In summary, the compensating valve means CV are initially actuatable in response to incremental reciprocable movements effected at closely spaced stations defining the full operating stroke of the low-pressure piston LP between its two extremes, such valve actuations being supplemented by pressure effective on the fluid in the low-pressure chamber 13 after said passages 11 have been closed to thus maintain the latter closed in response to such pressure reacting on said valve-forming element 21 upon mechanical closure by said actuating ring 25 under initial piston-carrying member actuation in a fluid pressurizing direction.

From the foregoing description augmented by an inspection of the drawing, it will be seen that I have produced a new and novel compensating valve means which advance the art to which the invention relates, by providing a more positive closure of the low-pressure cylinder LPC to seal-off the reservoir fluid therefrom for pressurizing the fluid within said cylinder for displacement therefrom to actuate, for example, the hydraulic brakes of a motor vehicle and the like. The compensating valve finds special utility in master brake cylinders of the multistage type, and other types of hydraulic actuators wherein conditioning of the fluid for pressurization is required preliminary to the actual displacement of such pressurized fluid to actuate the connected hydraulic device. This novel compensating means are also suitable for the conventional single-piston master brake cylinders mounted on the engine side of the vehicle firewall 14 for actuation by the suspended-type pedal arrangement as shown.

The preferred embodiment of the invention has been illustrated and described. It should be understood, however, that the invention contemplates any and all modifications, substitutions and/or arrangements of the parts comprising the same as embraced by the terms of the claims hereunto appended.

Having thus described my invention, I claim:

1. In control valve mechanism, the combination of a fluid passage incorporated in a fixed member terminating in a face portion; an element movable relatively with respect to said face portion to close and open said passage for controlling fluid flow therethrough, when in abutting and spaced relationship, respectively, with respect thereto; an abutment-engaging element spaced from said face portion for defining the relative operating movement of said movable element; a reciprocable actuatable element; an element having continuous frictional engagement with said actuatable element for limited conjoint movement therewith and for accommodating relative movement of said actuatable element in the same direction in which said conjoint movement was effected whereby minute reciprocable movements of said actuatable element impart like-movements to said friction element; mechanical means for directly connecting said movable element and friction element to move as a unit to close and open said passage; and means adapted to actuate said actuatable element.

2. In control valve mechanism for controlling flow of fluid between a fluid supply reservoir and a fluid pressurizing chamber incorporated in a chamber-defining casing, and a passage incorporated in said casing normally open between said reservoir and chamber, comprising a valve seat defining the open end of said passage confronting said pressurizing chamber; a valve-forming element movable between unseated and seated relationship with respect to said valve seat to open and close, respectively, said passage; an abutment-engaging element spaced from said valve seat for defining the relative operating movement of said valve-forming element; a reciprocable actuatable member having an operating stroke between two extremes for pressurizing the fluid in said chamber; an element having continuous frictional engagement with said actuatable member for limited conjoint movement therewith defined by said relative operating movement of said valve-forming element, said friction element accommodating relative movement of said actuatable member in a pressurizing direction upon effecting conjoint movement of said valve-forming element to close said passage, and thereby stabilizing the latter element in passage closing position in accordance with the thrust force transmittable by the frictional coefficient obtaining between said actuatable member and said friction element; a surface portion on said valve-forming element subject to the fluid pressure effective in said pressurizing chamber to supplement said thrust force in stabilizing said valve-forming element in passage closing position; mechanical means interconnecting said friction element with said valve-forming element for movement as a unit to close and open said passage; and means adapted to actuate said actuatable member.

3. In control valve mechanism, the combination of a fluid passage incorporated in a fixed member terminating in an annular face portion; an element movable relatively with respect to said face portion to close and open said passage for controlling fluid flow therethrough, when in abutting and spaced relationship, respectively, with respect thereto; an abutment-engaging element spaced from said face portion for defining the relative operating movement of said first-defined element; another element spaced from said first-defined element; a plurality of circumferentially spaced elements adapted to interconnect said first-defined element with said other element to move as a unit; a friction engageable actuating element directly connected to said other element to move as a unit therewith; mechanical means for effecting said direct connection between said first-defined and other elements; a reciprocable actuatable member having a portion projecting through said actuating element in continuous frictional engagement therewith, to effect conjoint movement thereof whereby minute reciprocable movements of said actuatable member impart like-movements to said friction element and connected first-defined and other elements to place said first-defined element into abutting and spaced relationship, respectively, with respect to said face portion thereby enabling fluid flow through said passage when the latter is open; and means adapted to actuate said actuatable member.

4. A control valve mechanism constructed in accordance with claim 3 in which the first-defined and other elements are ring-like and said actuatable member is cylindrical, and including a reduced extension formed by diminishing the terminal portion of the normal diameter of said first-defined member to provide another abutment-engageable element spaced from the first-defined abutment-engageable element, to define the relative operating movement of said first-defined element, the latter element being adapted to cooperate with the end of said passage which terminates flush with said other abutment-engageable element and being slidably mounted on said extension; and an annular groove in said extension adjacent the end thereof fitted with a split metallic ring spaced from said other abutment-engageable element for defining the first-defined abutment-engageable element.

5. A control valve mechanism constructed in accordance with claim 3 in which said mechanical connecting means comprise: an external annular groove in the outer peripheral surface of said friction element for receiving a portion of said other element to enable conjoint axial movement thereof.

6. In control valve mechanism, the combination of a plurality of passages incorporated in a fixed member terminating in an annular face portion; an element movable relatively with respect to said face portion to close and open said passages for controlling fluid flow therethrough, when in abutting and separated relation, respectively, with respect to said face portion; a pair of abutment-engageable elements disposed in spaced relationship with one of said elements being defined by said face portion to establish the relative operating movement of said first-defined element; a split-type contractible actuating ring having a portion connected to said first-defined element to move as a unit therewith; a reciprocable actuatable member having a portion projecting through said actuating ring in continuous frictional engagement therewith to effect conjoint movement thereof, whereby minute reciprocable movements of said actuatable member at closely spaced stations along the full operating stroke thereof, impart like-movements to said actuating ring and first-defined element to place the latter element into abutting and separated relationship, respectively, with respect to said face portion thereby enabling fluid flow through said passages when the latter are open; mechanical means interconnecting said actuating ring and first-defined element to move as a unit; and means adapted to actuate said actuatable member.

References Cited by the Examiner
UNITED STATES PATENTS 2,908,253   10/59   Randol _____ 137—596.2

M. CARY NELSON, *Primary Examiner.*